Oct. 2, 1962　　　　　C. H. TYSON　　　　　3,056,900
ELECTRODE STRUCTURES AND METHOD OF FABRICATING THE SAME
Filed Feb. 23, 1960　　　　　　　　　　　　　2 Sheets-Sheet 1

INVENTOR.
CHARLES H. TYSON
BY
F. D. Pregel
ATTORNEY

INVENTOR.
CHARLES H. TYSON
BY
F. D. Prager
ATTORNEY

United States Patent Office 3,056,900
Patented Oct. 2, 1962

3,056,900
ELECTRODE STRUCTURES AND METHOD OF FABRICATING THE SAME
Charles H. Tyson, Hatboro, Pa., assignor, by mesne assignments, to Philco Corporation, Philadelphia, Pa., a corporation of Delaware
Filed Feb. 23, 1960, Ser. No. 10,482
4 Claims. (Cl. 313—346)

This invention relates to an electrode unit, particularly a cathode unit, for use in a cathode ray tube or the like; and it also relates to combinations of such units with associated electrode means, as well as to the method of fabricating such units and combinations. The invention is particularly, although not exclusively, characterized in that it provides low-power generation of controlled cathode rays, which is desired for instance in battery-operated, portable television receivers.

Heretofore it has been difficult, if not impossible, to provide low-power operation of a picture tube cathode, or in other words, high thermal efficiency thereof, and at the same time to provide geometrical accuracy of the electron beam. For instance, when cathodes of known thermionic types were mounted on delicate wire supports in order to minimize unnecessary heat-dissipating masses and surfaces and corresponding losses of efficiency, the operation of the tube tended to be disturbed by so-called microphonic effects, involving vibration of such supports, with resulting impairment of definition of the electron beam. On the other hand, when more rigid supports were provided for known cathode units, these latter supports presented correspondingly large thermal masses and surfaces, thereby causing undesired heat losses and adding to the power requirements.

These and other problems have been avoided by the invention, which can briefly be characterized as using, for the indicated purposes, a novel combination of cathode, heater filament, and support elements. The cathode supporting device, as illustrated herein, is a three-wire structure, arranged in tripod fashion and comprising a pair of filament lead wires and a cathode lead wire, said three wires supporting a short, cylindrical cathode and filament unit, in front of a control grid plate and in a location far from other structures and thermal masses. The far ends of the three wires can be anchored in, and extended through, beads of solidified plastic material in the control grid structure, thereby also facilitating the process of forming the new unit.

Figure 1:
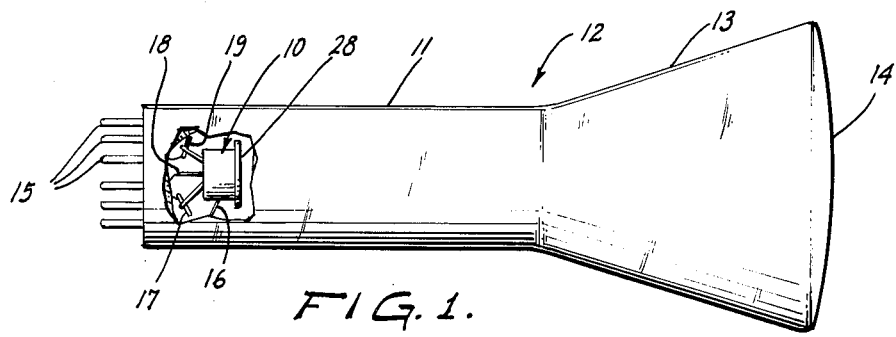
Figures 2, 3:
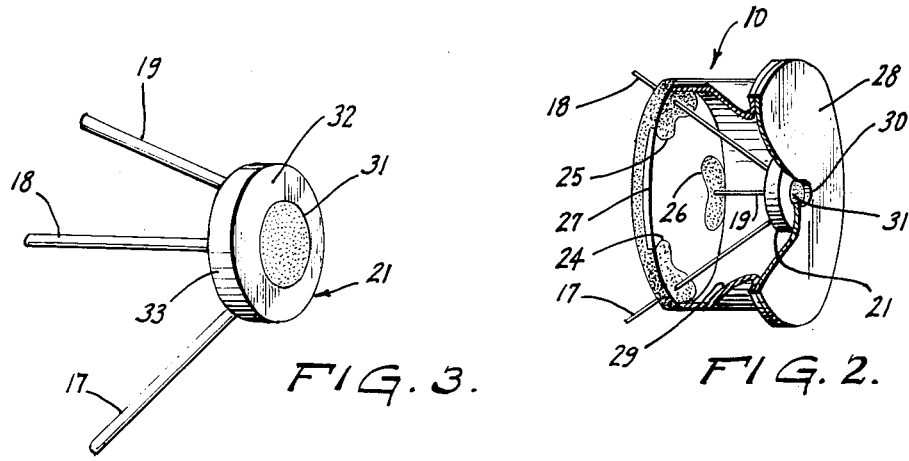
Figure 4:
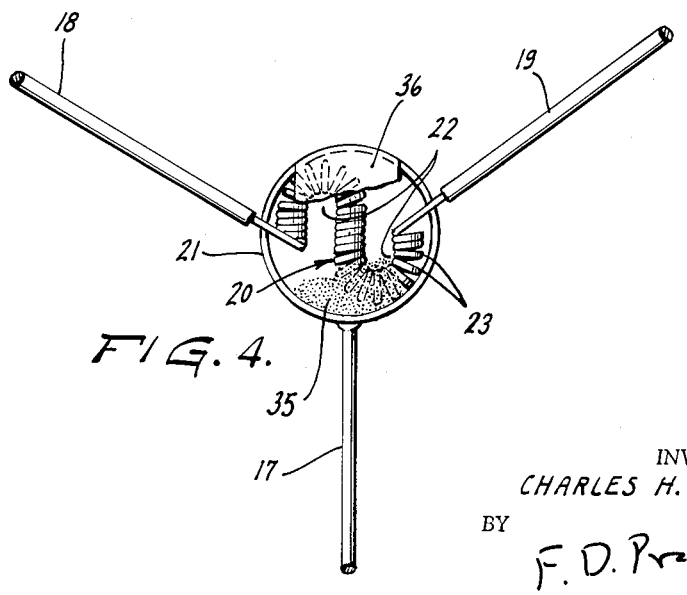

Such a unit will now be described, with reference to the drawing appended hereto. FIGURE 1 of the drawing is a slightly enlarged side view of a picture tube, partly broken away to show the new control grid unit. FIGURE 2 is a more enlarged perspective view of the new control grid unit, partly broken away to show the new cathode unit. FIGURES 3 and 4 are still more enlarged illustrations, presenting respectively, a perspective view and an end view of the new cathode unit or subassembly, by itself, with outer parts of the wire structure broken off to conserve space.

Figure 5:
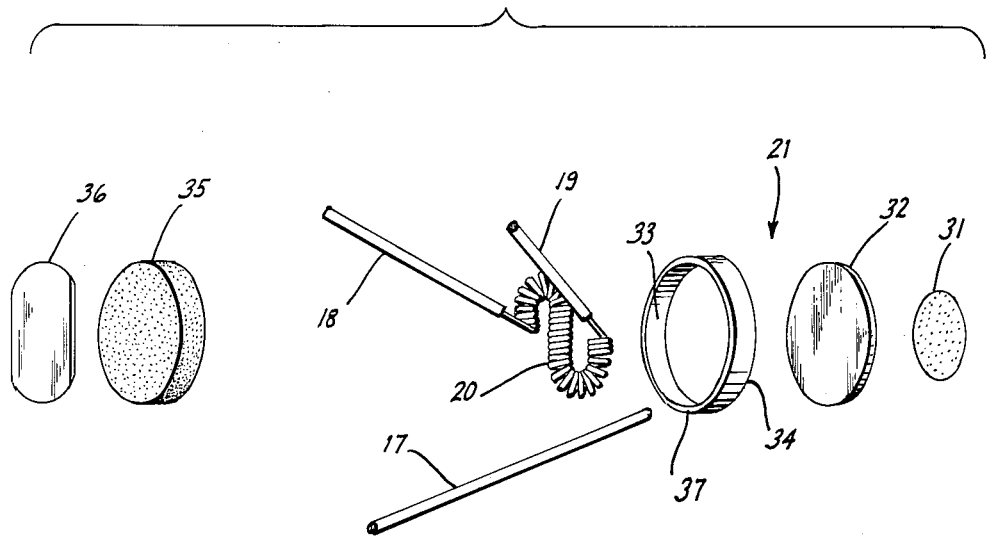
Figure 6:
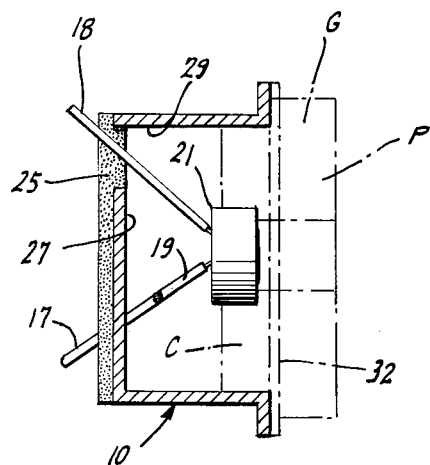

FIGURE 5 is an exploded, perspective view of the above mentioned subassembly. FIGURE 6 is a schematic, sectional side view, indicating the way in which a holding tool or device can be used in carrying out the fabricating method of the invention.

Referring first to FIGURE 1: the new electrode structure 10 is employed as an electron gun element mounted in the neck 11 of a picture tube 12. The illustrated tube is of the type using a narrow angle of cathode ray deflection and has a correspondingly narrow-angled bulb 13. It is shown as being narrow and also short, so that it has a very small face 14. In a television receiver of portable, battery-operated type, the diameter of this face may for instance be two inches and the small televised picture, appearing on this tube face, can be viewed through an optical magnifying system, not shown.

It is unnecessary for the explanation of this invention to show the entire electron gun, including for instance an accelerating screen grid and a high voltage anode; nor is it necessary to illustrate beam-deflecting coils and other well known parts of the apparatus. It should merely be noted that some of the electrical connecting plug elements 15, which are shown as being provided at the end of neck 11, have individual series connection with: a connecting wire 16 for supplying signal voltage to the control grid element of electrode structure 10; a connecting wire 17 for the cathode in said structure; and two further connecting wires 18, 19. The latter wires, as best shown in FIGURE 4, are secured to opposite ends of a heating filament 20, disposed in a cathode cap 21. Filament 20 is shown as a coil having a pair of major convolutions 22 to form an S shape and, superimposed thereon, a series of minor convolutions 23 of helical form. This provides for heating with considerable efficiency and within a limited space.

In accordance with the invention, the cathode and filament lead wires 17, 18, 19 extend in mutually similar, rearward and outward directions from cap 21, so that said wires and cap form a tripod structure. This structure is held together by the inner end portions of the wires, which converge to and are directly or indirectly mounted on cathode cap 21. Outer end portions of these legs or wires 17, 18, 19 are, as shown in FIGURE 2, anchored in solidified plastic beads or inserts 24, 25, 26, filling equidistant peripheral apertures of a plate 27, said plate forming an end portion of the control grid unit 10. The so supported cathode cap 21 is faced by a control grid plate 28, forming a principal part of said unit 10 and which is disposed a small distance from the cathode cap, the two grid electrode plates 27, 28 being rigidly interconnected by a flanged, cylindrical housing member 29. The control grid plate 28 has the usual, small, central aperture 30, opposite electron emissive coating 31 on the outside of end pltae 32 of the cathode cap 21, see FIGURE 3.

The component parts of the cathode, filament and tripod unit are best shown in FIGURE 5. They comprise a metallic side wall 33 of cap 21, said side wall having a front edge 34 secured to the metallic end wall 32, as for instance by welding, so that said walls can substantially surround and confine the cathode heating coil 20. Within the confines of this side wall, the S-shaped coil of filament wire, having suitable electrical conductivity, can be, and preferably is, bonded to the inside of cap 21, by a body 35 of refractory material, which material preferably has low electrical conductivity to minimize the need for reliance on filament-insulating coatings (not shown), while having reasonably high thermal conductivity to minimize the heating period of the tube. The refractory bonding material, with coil 20 therein, is firmly held within the cathode cap by a holder plate 36, welded to a rear edge 37 of side wall 33. Since filament 20 is embedded in body 35 and said body is pressed against the inside of end plate 32, by holder plate 36, a close and efficient thermal bond is maintained between the filament and the electron emissive coating 31 on the outside of plate 32.

One leg 17 of the tripod structure, as best shown in FIGURE 4, has an inner end welded to the side wall of cathode cap 21, while the other tripod legs 18, 19 are suitably attached to ends of filament coil 20. Desirably, the three tripod legs as well as the side wall of the cathode cap are made of metals having uniform, low coefficients of thermal conductance and of thermal expansion. It will further be understood that said legs are preferably dimensioned so that no appreciable amount of heat is developed, particularly in legs 18, 19, serving as filament leads, incident to the flow of current through said leads to filament 20.

It is further to be noted that the tripod legs or wires 17, 18, 19, as shown in FIGURE 2, extend rearwardly and outwardly from the hot cathode so as to space the cathode from the relatively massive grid walls 27, 29 by distances at least comparable to the diameter of the cathode, thereby minimizing the radiation of heat to said walls and the consequent dissipation of heat from said walls and thus contributing to the thermal economy of the device. In this connection it may further be noted that FIGURES 3, 4 and 5 are fragmentary in that they show only inner parts of the tripod legs or wires.

By virtue of the so defined tripod mounting of the cathode and heater structure, the entire heater, cathode and support subassembly 17 to 36 of FIGURES 2 to 5 represents a minimum of thermal mass and thermally unused surface and yet a maximum of mechanical resistance to microphonic effects and the like, including also high resistance to distortion by thermal expansion. The cathode cap 21 is made just large enough for the purpose of housing and holding, on one side of a heat-conductive cathode plate 32, the mentioned heater coil 20 which generates sufficient heat for the desired operation of electron-emissive coating 31 on the other side of said plate and, accordingly, cathode end wall 32 is only slightly larger than coating 31, and side wall 33 is generally very short, in comparison with the diameter of said end wall. Thus the cathode cap 21, at the apex of tripod wire structure 17, 18, 19, has the form of a flat, circular slug.

In operation, this slug 21 is red-hot. The adjacent central portion of control grid plate 28 is kept as cool as possible. One reason for this latter feature is that the control grid serves to expose an electron stream, emitted by slug 21, to varying negative potentials, in aperture 30, and thereby to control the size of the electron beam, and that the control grid itself therefore must be prevented from becoming a source of electron emission. This is achieved by not only keeping it cool but also forming it of relatively non-emissive material. It is therefore preferred to form said plate 28 from a metal such as stainless steel and to provide it with highly reflective polish on the side facing the hot element 21. By these and other known expedients, the maintenance of high temperature is entirely limited to the region occupied by the small slug 21, comprising electron emitter 31, thus avoiding the possibility that the more or less adjacent, large surfaces of the grid structure could receive and dissipate any large amounts of heat.

The entire slug, tripod and grid structure can accordingly be characterized as having a minimum of heat radiating surface. Thus it facilitates the use of low wattage. At the same time said structure is characterized by the tripod form of legs 17, 18, 19, whereby it provides such maximum of rigid and durable construction as is compatible with the minimizing of heat radiating surface. As a result, the structure safely retains proper orientation of the hot cathode element, relative to control grid plate 28. Neither microphonics nor thermal distortions produce any significant displacements of the cathode relative to the control grid aperture. Since relative displacements of this kind, in any of the three dimensions of space, would tend very seriously to distort the cross-section and/or location of the electron beam, and thereby to impair the TV picture, this maintenance of adequate rigidity, by the tripod structure, is a feature of great value in the reception of TV programs.

Referring now to the method of originally establishing the proper adjustment of the cathode, relative to said grid area, it will readily be understood from FIGURE 6 that cap 21 is held in a suitably recessed and shouldered end portion C of a mounting plug element P, which element is suitably positioned in control grid structure 10 by means of another shouldered end portion G, engaging the inside and the end of grid wall 29. This mounting of the cathode cap is used, temporarily, prior to installation of grid plate 28 and until the plastic material of beads 24, 25, 26 has been applied and solidified, around outer portions of tripod wires 17, 18, 19. When these beads or inserts have been formed and hardened, plug P can be removed, leaving cap 21 in position. Plate 28 can thereafter be installed, by obvious welding procedures or the like, and the electrode unit then forms a rigid structure which is substantially distortion-proof in spite of the high temperatures which must be maintained within and on the cathode cap 21.

In operation electrical current flows through legs 18, 19 of the tripod structure, thereby actuating the filament, while suitable cathode potential is maintained through the third leg 17. The electrical current which is thus supplied to the heater filament produces incandescent heat therein and, after a short heating-up period, produces and maintains a high degree of temperature in and throughout the refractory bonding body and the entire cathode cap, thereby causing the electron emissive coating 31 to emit electrons, into and through the adjacent control grid aperture 30, to form a controlled cathode ray or electron beam.

The improvement achieved by the novel structure is in large measure identified with the low power required for maintaining the beam and with the high degree of definition, maintained in said beam, by virtue of the fact that the entire actuating and supporting structure for the emissive coating 31 has been provided with a minimum of mass and surface (other than the coating surface itself) and yet with a maximum of strength and stability under the operating conditions—all this being achieved by the basically simple tripod mounting wire structure 17, 18, 19, supporting the flat, slug-shaped cathode cap 21.

This structure has also been found to maintain the minute distance between the emissive coating and the control grid aperture plate and the relative orientation of these elements with a high degree of uniformity, regardless of possible variations of conditions such as the temperature of the cathode in different types of cathode ray tube operation. Such uniformity of spacing and orientation, in turn, is required in order to preserve the initially mentioned, desirable accuracy of the electron beam.

While only a single embodiment of the invention has been described, it should be understood that the details thereof are not to be construed as limitative of the invention, except insofar as is consistent with the scope of the following claims.

I claim:

1. A thermionic cathode, comprising: a plate-like metallic cap of short axial extension in comparison with its width and having an end wall and a side wall; an electron-emissive coating on the outside of the end wall; a heater filament, held in close thermal coupling with the inside of said end wall; a pair of filament lead wires, one secured to each end of said filament; and a cathode lead wire, secured to said side wall, said wires being substantially longer than said axial extension of said cap and extending from said cap in such a way that said cap and wires form a tripod structure with a base at least approximately as wide as said wires are long and considerably wider than said axial extension of said cap.

2. A cathode as described in claim 1, additionally including a body of filament bonding, electrically non-conductive and thermally conductive material, confined by said side and end walls and embracing said filament; and a plate secured to the rear edge of said side wall to hold said body of bonding material against the inside of said end wall.

3. In an electron gun: a cathode plate with an electron-emissive coating on one side thereof and with a heating filament bonded to the other side thereof; a cathode supporting and connecting tripod-like structure, comprising a pair of filament lead wires, one connected to each end of said filament, and a cathode lead wire, connected to said plate; a metallic control grid structure having first and second end plates, facing respectively said one and other sides of the cathode plate, the first end plate being centrally apertured, opposite said coating, and the second end plate having three equidistant peripheral apertures separated by distances appreciably greater than the combined thickness of said cathode plate and heating filament; and beads of electrically insulating material, one in each of said apertures, one of said lead wires extending through and being held by each of said beads.

4. An electron gun as described in claim 3 wherein said control grid structure includes a cylinder wall interconnecting said end plates and said tripod-like structure supports the cathode plate adjacent the centrally apertured end plate and remotely from the other end plate and from the cylinder wall.

References Cited in the file of this patent

UNITED STATES PATENTS

| | | |
|---|---|---|
| 2,467,506 | Snell | Apr. 19, 1949 |
| 2,760,098 | Saunders | Aug. 21, 1956 |